No. 794,878. PATENTED JULY 18, 1905.
W. H. McKITRICK.
MACHINE FOR HARVESTING AND HUSKING STANDING CORN.
APPLICATION FILED JULY 29, 1903.

6 SHEETS—SHEET 2.

Witnesses:
J. McArthur
H. C. Rodgers

Inventor:
W. H. McKitrick
By George H. Thorpe
Atty.

No. 794,878. PATENTED JULY 18, 1905.
W. H. McKITRICK.
MACHINE FOR HARVESTING AND HUSKING STANDING CORN.
APPLICATION FILED JULY 29, 1903.
6 SHEETS—SHEET 3.

Witnesses
A. McArthur
H. C. Rodgers

Inventor.
W. H. McKitrick
By George Y. Thorpe
Atty.

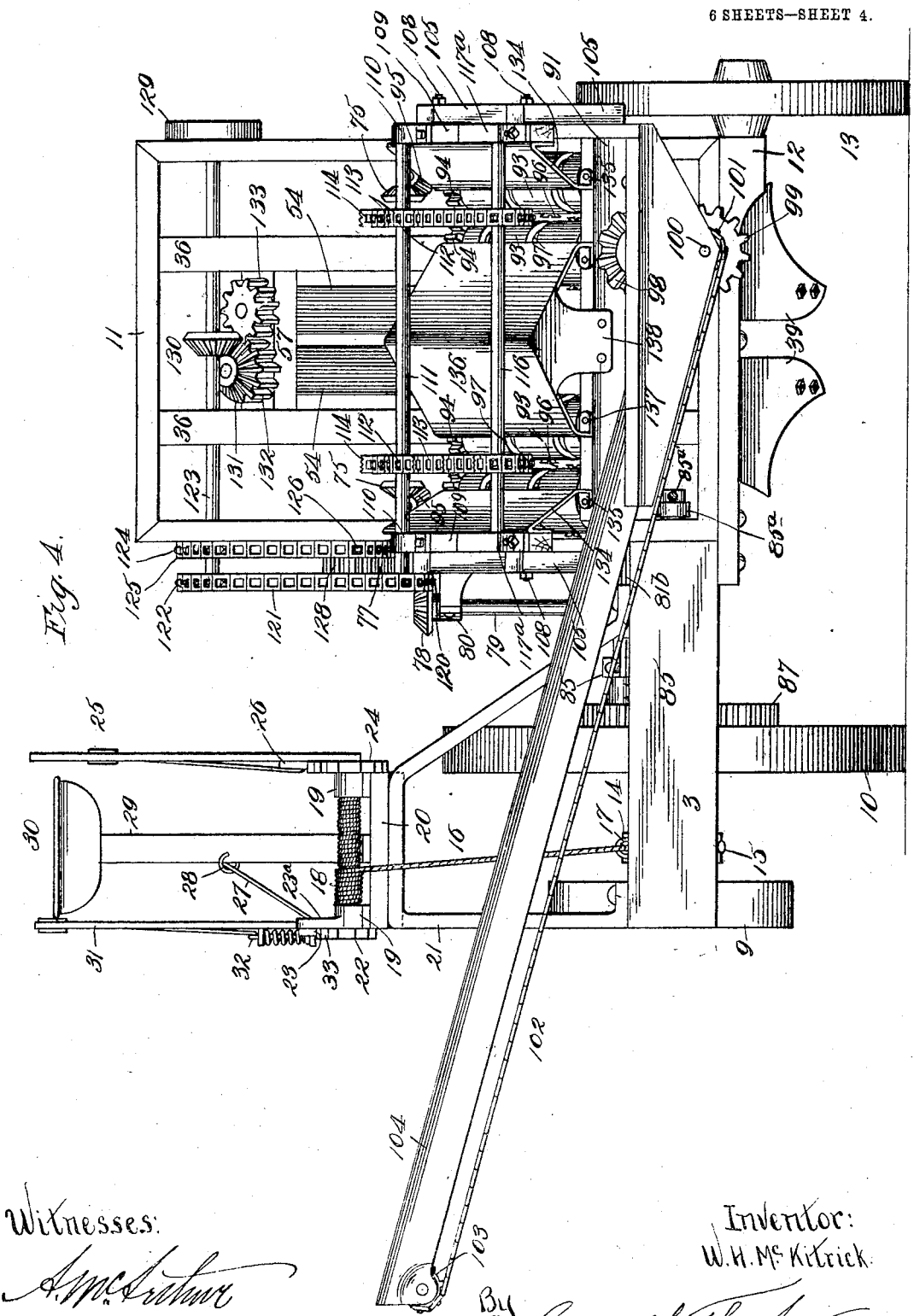

No. 794,878. PATENTED JULY 18, 1905.
W. H. McKITRICK.
MACHINE FOR HARVESTING AND HUSKING STANDING CORN.
APPLICATION FILED JULY 29, 1903.
6 SHEETS—SHEET 5.
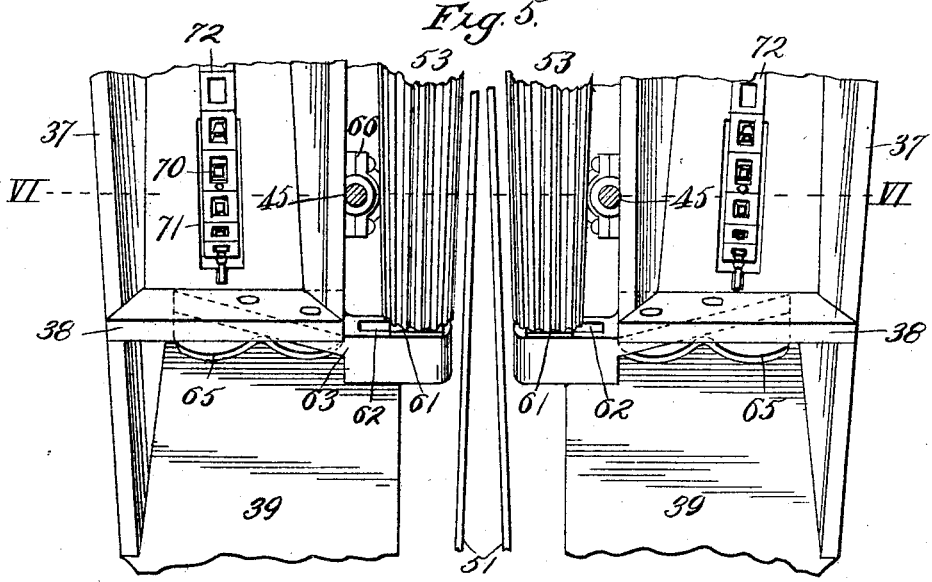
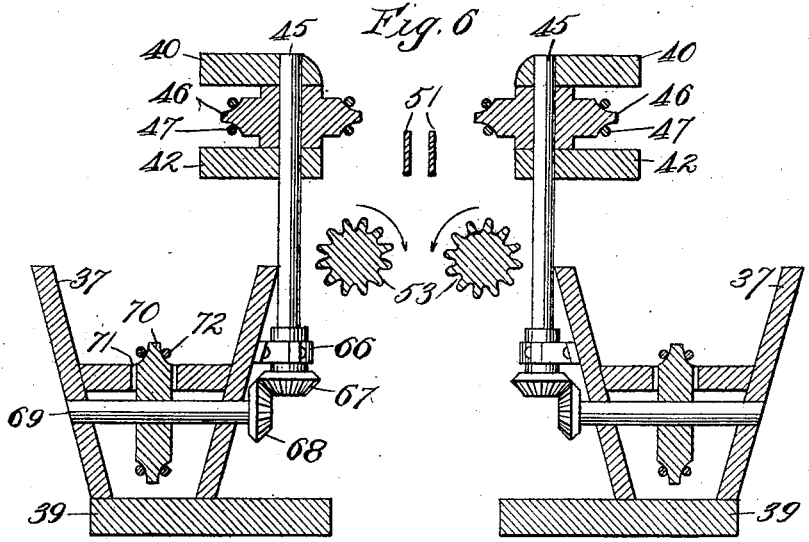
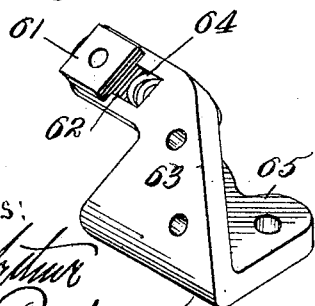
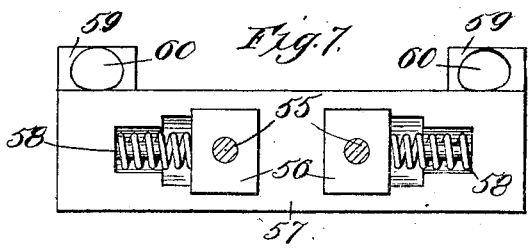
Witnesses:
A. M. Arthur
H. C. Rodgers
Inventor:
W. H. McKitrick
By George J. Thorpe
Atty.

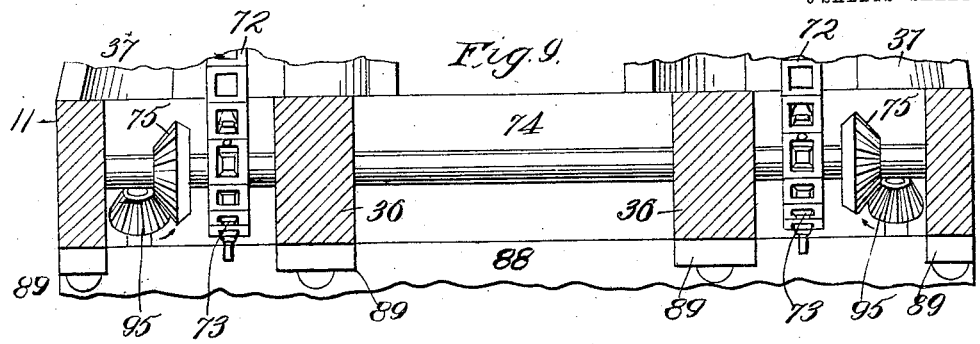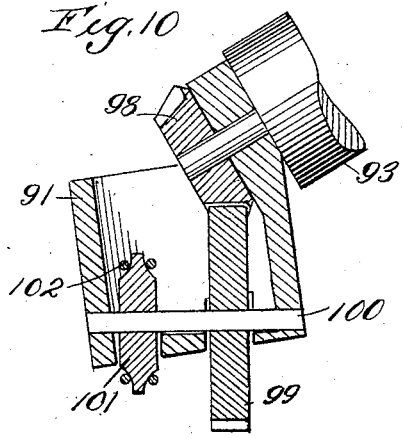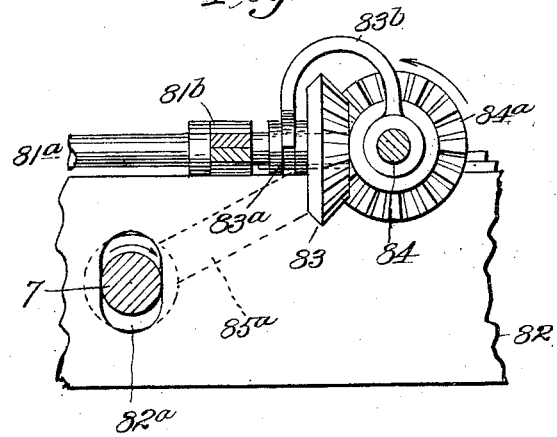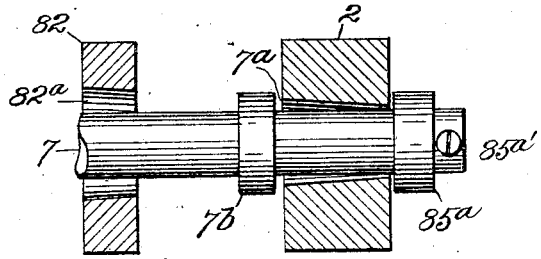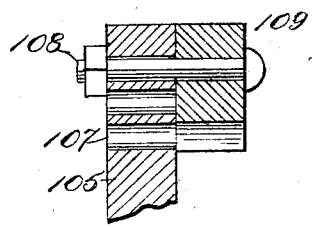

No. 794,878.

Patented July 18, 1905.

UNITED STATES PATENT OFFICE.

WILLIAM H. McKITRICK, OF MORSE, KANSAS.

MACHINE FOR HARVESTING AND HUSKING STANDING CORN.

SPECIFICATION forming part of Letters Patent No. 794,878, dated July 18, 1905.

Application filed July 29, 1903. Serial No. 167,490.

*To all whom it may concern:*

Be it known that I, WILLIAM H. McKITRICK, a citizen of the United States, residing at Morse, in the county of Johnson and State of Kansas, have invented certain new and useful Improvements in Machines for Harvesting and Husking Standing Corn, of which the following is a specification.

My invention relates to machines for harvesting and husking standing corn; and my object is to produce a machine of this character which can be used on a hillside as well as on level ground and which operates efficiently and reliably.

A further object is to produce a machine of this character of strong, durable, compact, and comparatively simple construction.

To these ends the invention consists in certain novel and peculiar features of construction and organization, as hereinafter described and claimed, and in order that it may be fully understood reference is to be had to the accompanying drawings, in which—

Figure 1:
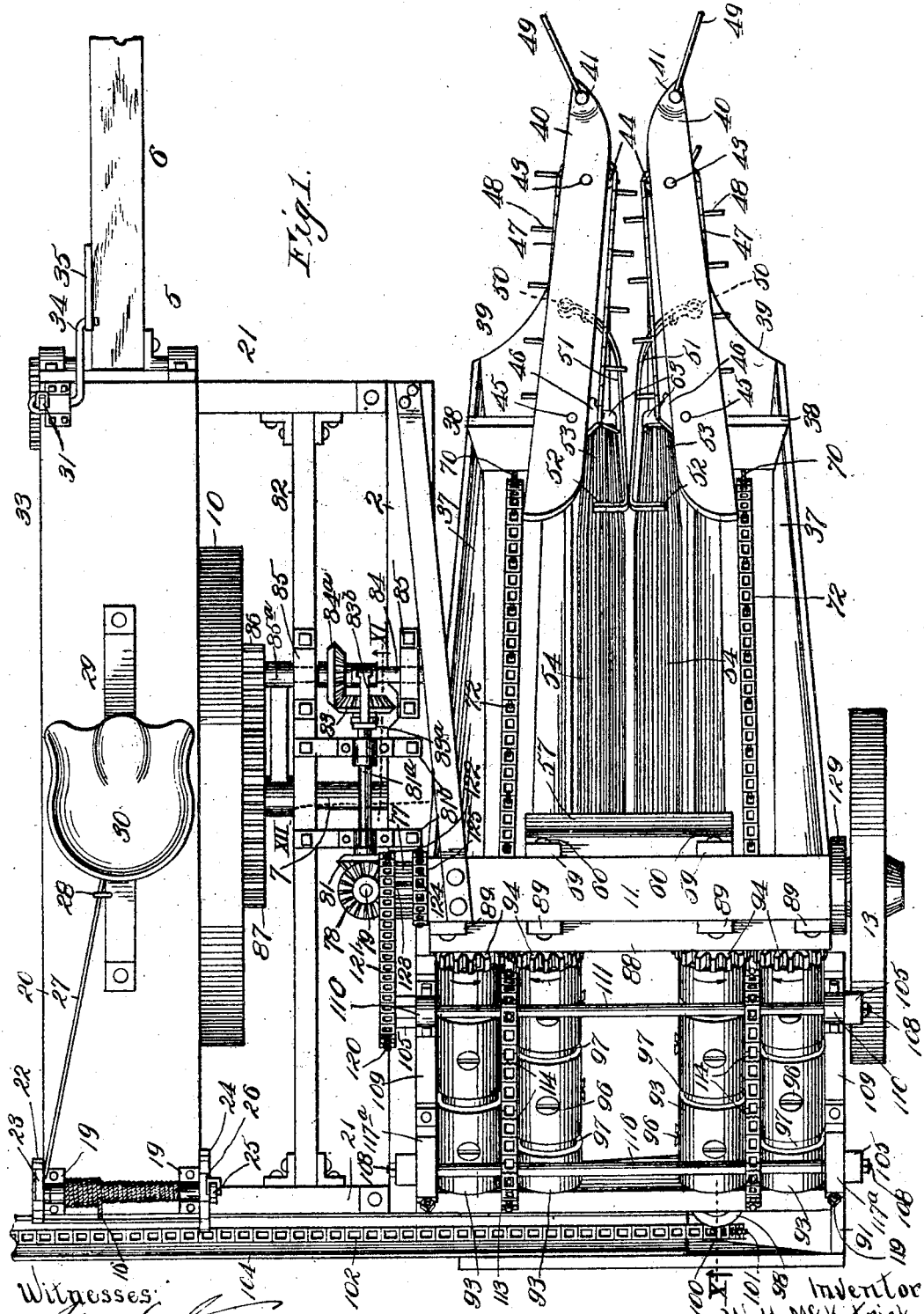
Figure 2:
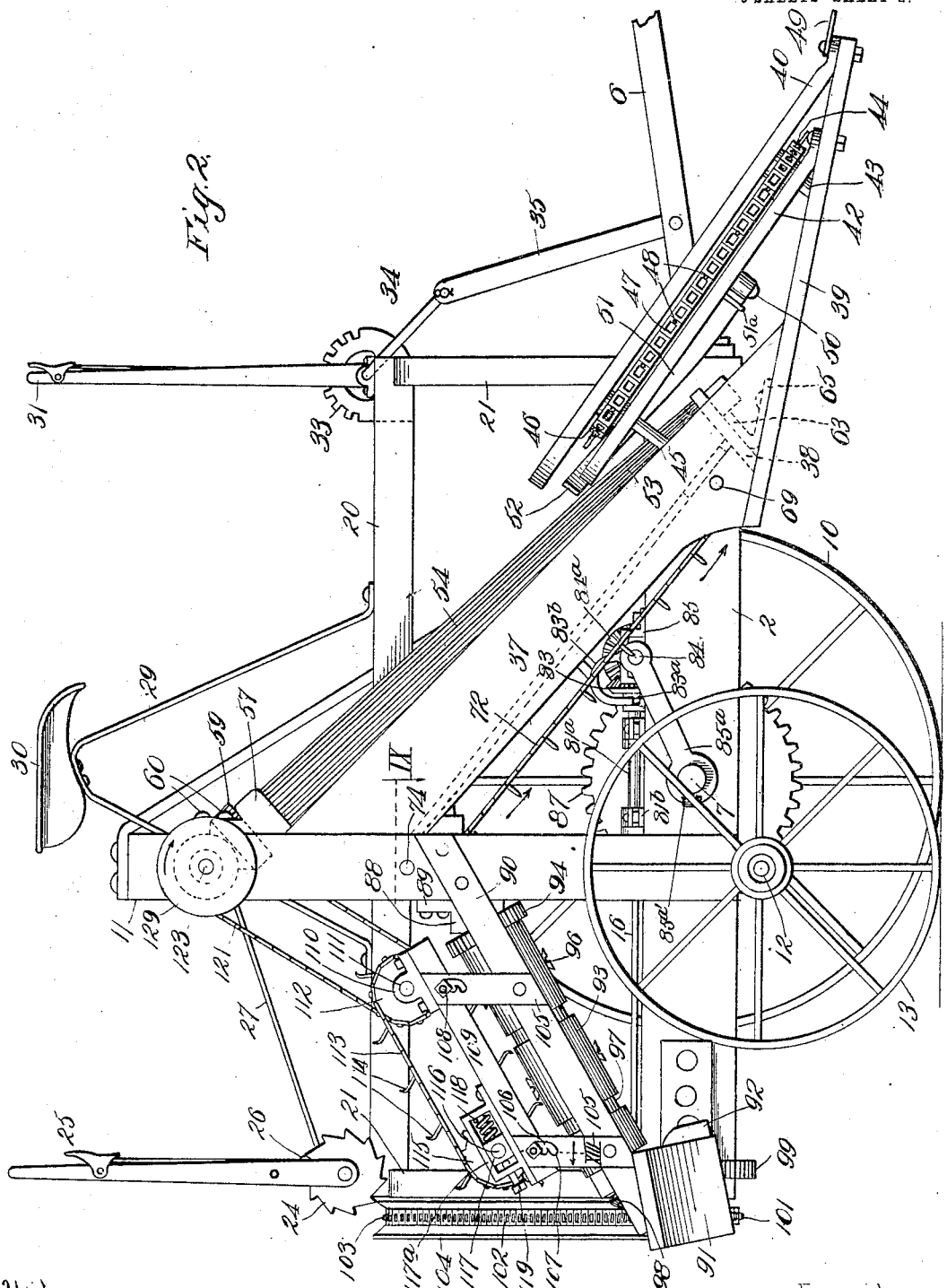
Figure 3:
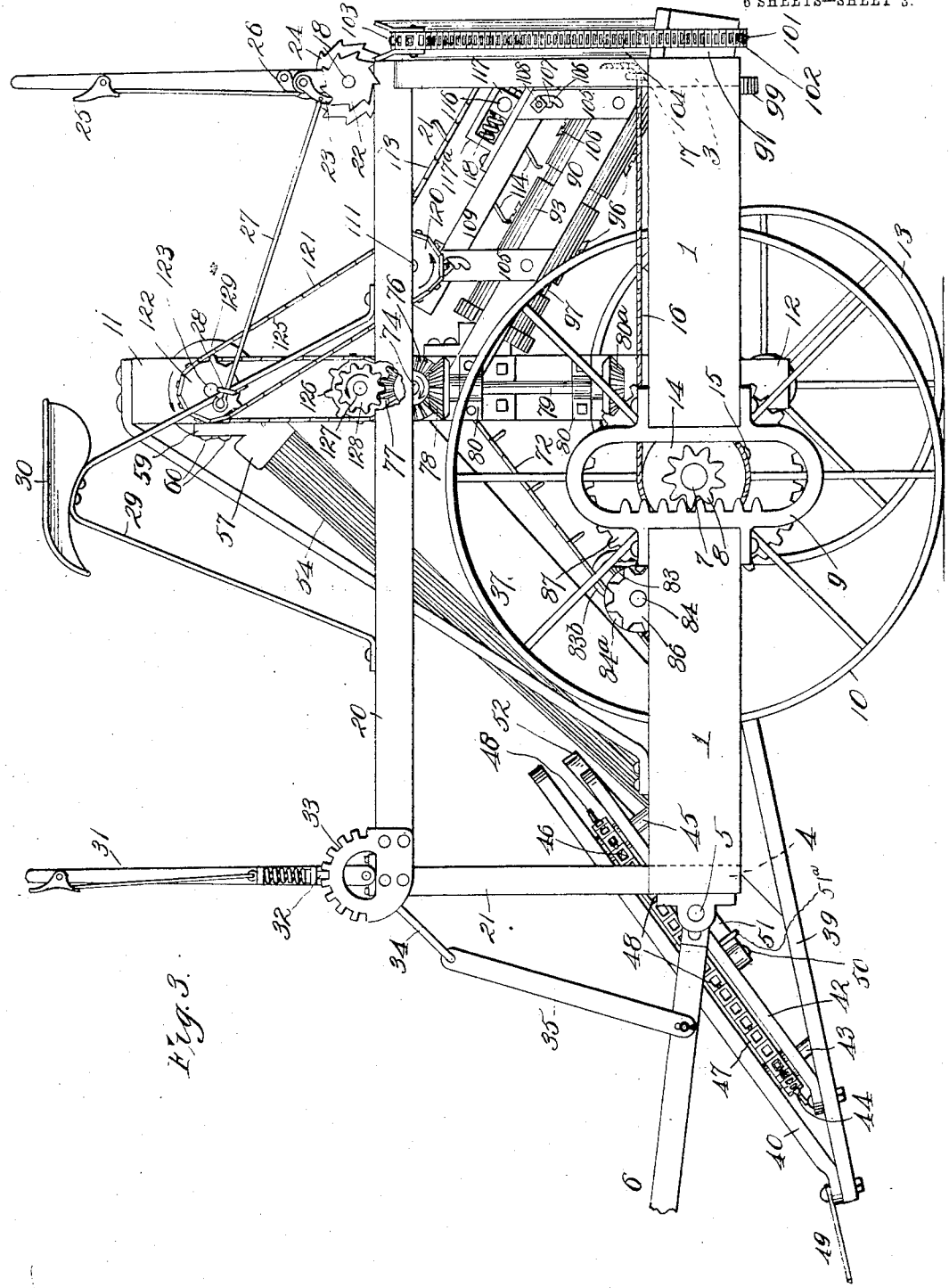

Figure 1 is a top plan view of a machine embodying my invention with the husking-guards omitted. Fig. 2 is a side elevation of the same. Fig. 3 is a view of the opposite side. Fig. 4 is a rear view. Fig. 5 is an enlarged plan view showing the front and lower ends of the harvesting-rolls and the elevators at opposite sides of the same. Fig. 6 is a vertical section on the line VI VI of Fig. 5. Fig. 7 is a detached view of the slotted bar provided with the spring-pressed journal-boxes for the upper ends of the harvesting-rolls, the shafts of said rolls being shown in section. Fig. 8 is an enlarged detail perspective view of the bracket and spring-pressed box carried thereby at the lower end of each roll. Fig. 9 is an enlarged horizontal section taken on the dotted line IX of Fig. 2. Fig. 10 is an enlarged vertical section on the dotted line X of Fig. 1. Fig. 11 is a vertical section on the dotted line XI of Fig. 1. Fig. 12 is a vertical section on the dotted line XII of Fig. 1. Fig. 13 is a vertical section on the dotted line XIII of Fig. 2.

In the said drawings like reference characters refer to corresponding parts throughout the figures.

A substantially horizontal frame comprises a longitudinal bar 1, composed of alined sections, a side bar 2, and cross-bars 3 and 4, respectively, connecting the rear and front ends of bars 1 and 2, and pivoted, as at 5, to the bar 4 to work vertically is a tongue 6.

7 is a shaft journaled at one end in a slightly-elongated bearing-opening $7^a$ in bar 2 and held from material longitudinal movement in one direction by collar $7^b$, said elongated opening being provided to permit the frame to play vertically to a slight degree in its limited tilting adjustment for a purpose which is hereinafter explained. At its opposite end said shaft is provided with a loose cog-wheel 8, meshing with the teeth of the rack-frame 9, which frame rigidly connects the sections of bar 1 together, and 10 is a supporting or traction wheel mounted on said shaft.

11 is a vertical and preferably rectangular frame rigidly secured in any suitable manner at its lower end to a bar 2 of the horizontal frame and provided with an underlying stub-shaft 12, extending transversely of the frame 11 and suitably secured thereto, on which shaft is mounted a supporting or traction wheel 13, which is offset from or out of alinement with wheel 10.

For the purpose of operating efficiently on a hill it is necessary to keep the harvesting mechanism, hereinafter described, in a substantially horizontal plane, and in order that this may be accomplished I provide the following mechanism to raise or lower the horizontal frame with respect to its supporting-wheel 10. 14 is a disk journaled on shaft 7 and formed with or rigidly connected to cog-wheel 8, and peripherally connected and secured to said disk, as at 15, is a cable 16, extending around through the guide-loop 17 on the rear cross-bar 3 and upward therefrom to a winding drum or shaft 18, journaled in brackets 19, secured upon a platform 20, surmounting supporting-frames 21, rising from the horizontal frame. Said winding drum or shaft is provided at one end with a ratchet-wheel 22, normally engaged by a gravity-dog 23, mounted on an arm $23^a$ of the contiguous bracket 19, said pawl and ratchet being adapted to prevent accidental unwinding of the cable and the consequent lowering of the horizontal frame with respect to wheel 10. On the opposite end of said winding drum or shaft is a ratchet-wheel 24, and journaled on the shaft is a lever 25, provided with the usual spring-actuated pawl 26 normally in engagement with said ratchet-wheel, the arrangement being such that the operator by swinging said lever forwardly may wind the cable upon the drum to rotate disk 14 and cause the cog-wheel 8 to lift the rack-frame, the result being the elevation of the horizontal frame with respect to wheel 10. To lower the horizontal frame when desired, the person in control trips pawl 26 from engagement with ratchet-wheel 24 and then grasps the front end of rod 27, linked to pawl 23, so as to withdraw said pawl from engagement with wheel 22, the front end of said rod being supported and guided by a loop 28, secured to standard 29, supporting the seat 30, upon which the driver or person in control is adapted to be seated, the standard being supported on the platform 20. The descending movement of the horizontal frame is arrested at the point desired by simply releasing pawl 23 and permitting it to reëngage ratchet-wheel 22, as will be readily understood.

31 is a lever mounted upon the front end of platform 20 and provided with a spring-actuated dog 32 for engagement with sector 33, secured to said platform, said lever being provided with a crank 34, pivotally connected by loop 35 with the tongue 6, so that the driver by grasping said lever and withdrawing the dog may be enabled to raise or lower the front end of the horizontal frame with shaft 7 as its axis, and thus accommodate the machine to operation on descending or ascending grades, it being understood, of course, that the front end of the tongue is prevented from materially rising or falling through its usual connection with the draft-animals.

36 represents vertical standards partitioning and bracing the upright frame 11, and secured to said frame and extending downwardly and forwardly from the same and registering at their upper ends with the spaces between the sides of the frame and said standards are a pair of troughs 37, the lower ends of the troughs being closed by end plates 38, and secured to the lower ends of the troughs are forwardly and downwardly projecting arms 39, flared outwardly at their front or lower ends. (See Fig. 4.) Secured to the front ends of said arms and diverging rearwardly and upwardly at an incline thereto are bars 40, correspondingly flared at their front ends, as at 41, (see Fig. 1,) and paralleling said bars and below the same are bars 42, also secured to arms 39.

43 represents short shafts journaled in guide-bars 40 42 and provided with sprocket-wheels 44, and journaled in the bars near their rear ends are shafts 45, provided with sprocket-wheels 46, the latter being connected by endless chains 47 to sprocket-wheels 44, which chains are equipped with fingers 48 for the purpose of engaging and forcing rearwardly the stalks of corn as they are successively encountered, gathering-arms 49, projecting forwardly from the front ends of bars 40, serving to properly guide between said bars and said chains or conveyers such corn as may be leaning to the right or left of the perpendicular.

Secured to the under side of bars 42, as at 50, are a pair of rearwardly-converging spring-guides 51, so disposed as to provide a flaring or gradually-constricted mouth, which the cornstalks easily enter, the spring-guides each being formed of a single integral piece and having their rear ends bent outwardly in opposite directions, as at 52, above and contiguous to the forwardly-tapering ends 53 of the peripherally-corrugated rolls 54, said rolls being disposed close together and between and slightly above the troughs in order that the corn as broken from the stalks shall be properly deposited in the troughs, the outwardly-bent portions 52 of the spring-guides 51 insuring the delivery of what corn may tend to slide to the lower ends of the rolls into the troughs, as will be readily understood by reference to Figs. 1, 2, and 3. In order to impart the necessary elasticity to the guides, I provide the tension-studs $51^a$ $51^a$, which are secured to the under side of each of the bars 42 42 at a point in the rear of and closer together relatively than are the points at which the spring-guides are secured to the bars, the guides being brought in front of the tension-studs, which serve as a bearing for the guides, which latter abut against the studs, the free ends of the guides engaging each other. The upper ends of the roll-shafts 55 are journaled in boxes 56, mounted in slotted cross-bar 57, springs 58 pressing said boxes, and therefore said rolls, toward each other with a yielding pressure, the slotted cross-bar having lugs 59, through which bolts 60 extend to secure the bar to standards 36. The lower ends of said shafts are journaled in boxes 61, slidingly mounted in slots 62 of angular brackets 63, which brackets are provided with springs 64, pressing said rolls yieldingly toward each other. The brackets 63 bear against the trough ends 38 as a support for the same and are provided with base-flanges 65, bolted or otherwise secured to arms 39. Shafts 45, hereinbefore mentioned, extend down between the rolls and troughs and are journaled near their ends in bearings 66, secured to the troughs, the shafts being geared through the medium of bevel-gears 67 68 to short shafts 69, journaled in the lower ends of the troughs and equipped with sprocket-wheels 70, which project up through openings 71 in the trough-bottoms. Sprocket-wheels 70 are connected by endless fingered chains 72, their upper strands being just above the bottoms of the troughs, with the sprocket-wheels 73 disposed between the sides of frame 11 and its standards 36, mounted upon transverse shaft 74, journaled in said frame. Said shaft is also provided with bevel-gears 75 for a purpose which hereinafter appears and at the end contiguous to wheel 10 with a gear-wheel having bevel-face teeth 76 and peripheral cog-teeth 77, the bevel-teeth meshing with the bevel-gear 78 upon the upper end of the shaft 79, journaled in brackets 80, secured to frame 11. A bevel-gear 80$^a$ on said shaft 80 meshes with a bevel-gear 81 on shaft 81$^a$, journaled in brackets 81$^b$, secured at their opposite ends to bars 2 and 82, the latter being provided with a vertical slot 82$^a$ to permit of vertical play on shaft 7 when the machine is tilted, as hereinbefore referred to.

Rotatable with but slidable upon shaft 81$^a$ is a gear 83, having a grooved hub 83$^a$ engaged by the forked lower end of a yoke 83$^b$, said yoke being mounted loosely at its opposite end on a transverse shaft 84, having a bevel-gear 84$^a$, with which is permanently held in mesh by yoke 83$^b$ the bevel-gear 83. Shaft 84 is adapted to slide in guide-brackets 85 and is journaled at its ends in the arms 85$^a$, pivoted at their opposite ends on shaft 7 in order that cog-wheel 86 on the end of shaft 84 may be held reliably in engagement at all times with master-gear 87 on shaft 7. The swinging arm 85$^a$ at the inner side limits the longitudinal movement of shaft 7 in the opposite direction to that in which its movement is restricted by collar 7$^b$, as hereinafter referred to, (see Fig. 12,) arm 85$^a$ being held reliably on the shaft by abutment-screw 85$^{a'}$. As the machine is tilted it necessarily carries with it all of the gearing just described except the wheels on shaft 7. This raising of said gearing, however, does not change its operative relation with respect to gear 87, because swinging arms 85$^a$ draw the shaft 84 rearwardly in guide-brackets 85. This movement of shaft 84 is also accommodated without disturbing the relation between bevel-gears 83 and 84$^a$ by means of the yoke sliding gear 83 rearwardly on shaft 81$^a$, it being understood that when the frame is lowered these parts move in the opposite direction to that mentioned. It will thus be seen that the rotation of wheel 10 as the machine is drawn across the field, whether disposed horizontally or not, causes, through the medium of the train of gearing just described, the operation of shaft 74, which in turn imparts movement to the endless chains or conveyers 72 in the direction indicated by the arrow, Fig. 2.

A rectangular skeleton frame is secured to and extends downwardly and rearwardly, inclining from frame 11, its upper end being just below the upper end of elevating-troughs 37, said downwardly and rearwardly extending frame comprising a cross-bar 88, having lugs 89 bolted to the rear face of frame 11 and its standards 36. To the frame 11 are secured at their upper ends the side bars 90 and a transverse trough 91, the latter being secured rigidly to bar 2 by means of the angle-bracket 92 or otherwise suitably supported.

93 designates husking-rolls arranged longitudinally within and at the same angle as the frame just described, said frame being hereinafter termed the, "husking-frame," there being a pair or set of these rolls in longitudinal alinement with each trough 37, and the rolls of each set are provided with cog-wheels 94, geared together. One of each set of the husking-rolls has its shaft extended and equipped with a bevel-gear 95, meshing with the gear-wheel 75. (See Fig. 9.) Said rolls are provided with alternately-arranged husking screws or pins 96 and grooves 97, the pins and grooves of one roll being disposed opposite the grooves and pins of the companion roll, so that as an unhusked ear of corn is engaged by one of the screws of a roll it shall, by engagement with the registering groove of the companion roll, be prevented from sliding downward until said screw by the rotation of the roll has had time to partially or wholly tear the husks from the ear, the groove at the same time permitting the ear to yield slightly away from the screw, and thus avoid injury to the corn.

The shaft of one of the husking-rolls projects into the trough 91 and is provided with a bevel-gear 98, meshing with a gear 99 on a short shaft 100, journaled in the trough, said shaft being also provided with a sprocket-wheel 101, connected by an endless conveyer or chain 102 to the similar sprocket 103 at the upper end of the elevating-trough 104, adapted for delivering the husked corn into a wagon driven beside the machine or into any other suitable receptacle.

105 designates vertical standards rising from the side bars 90 of the husking-frame and provided near their upper ends with slots 106, formed with a vertical series of offsets 107 to permit of the vertical adjustment of bolts 108, said bolts projecting outward from the longitudinal bars 109, which bars are provided with bearings 110 at their upper ends for the transverse shafts 111, said shafts being provided with sprocket-wheels 112 vertically over the spaces between each pair of husking-rolls. Said sprocket-wheels are connected by longitudinal chains 113, equipped with toothed fingers 114, to the similar sprocket-wheels 115 of shaft 116. Said shaft is journaled in sliding boxes 117, mounted in slotted frames 117$^a$ and pressed rearwardly in said frames by springs 118 for the purpose of tensioning the "drag-chains," as chains 113 will be hereinafter termed. To tension or relax said chain, the abutment-screws 119 are adapted to be unscrewed or screwed farther into frames 117ª as will be readily understood by reference to Fig. 2. The function of these chains is to force the corn at a speed proportionate to that at which it is delivered by conveyers 72 down and upon rolls 93 to insure the proper husking action.

Mounted upon shaft 111 is a sprocket-wheel 120, connected by sprocket-chain 121 to sprocket-wheel 122 on shaft 123, journaled in frame 11, and mounted also on said shaft is a sprocket-wheel 124, connected by a chain 125 to a sprocket-wheel 126 on stub-shaft 127, a cog-wheel 128, cast integral with sprocket-wheel 126, meshing with and driven by the peripheral teeth 77 of gear-wheel 76, hereinbefore described, bar 20 being broken away in Fig. 3 to disclose the relation of said gears. On the opposite end of shaft 123 from sprocket-wheels 122 124 is a fly-wheel 129 for the usual purpose, and also mounted on said shaft about midway its length is a bevel-gear 130, meshing with the bevel-teeth 131 of a cog-wheel 132 on the upper end of one of the stripping or harvesting rolls 54, it being understood, of course, that as these rolls strip the corn from the stalk they incidentally remove a part of the husks from the ear. Cog-wheel 132 is provided with deep peripheral teeth and meshes with the similar cog-wheel 133 to effect the synchronous rotation of said stripping-rolls even though they move slightly apart under the pressure of an unusually thick cornstalk.

134 designates downwardly-converging sheet-metal guards disposed above the outermost husking-rolls and secured rigidly in position by bolts passing through lugs 135 into the inner wall of trough 91. An arched central guard 136 bridges the space between the inner husking-rolls and is secured reliably in position by having lugs 137 and 138 bolted to the trough, as shown in Fig. 4. The arrangement of the guards is such that the ears of corn are held upon the husking-rolls until they are eventually forced by the drag-conveyers into the trough 91 and the elevating-trough 104 as the machine is drawn across the field. The rotation of wheel 10, through the medium of the intermediate gearing described, not only operates conveyer 72, but also drives cog and sprocket wheels 128 126 of stub-shaft 127, said sprocket in turn imparting movement to sprocket-wheel 124 and said wheel to shaft 123. Shaft 123, through the medium of bevel-gear 130 and the connected gearing, revolves the stripping-rolls at a high rate of speed for the purpose explained. Shaft 123, through the medium of sprocket 122, chain 121, and sprocket 120, operates shaft 111 and through the same the drag-conveyers.

As the machine is drawn across the field the inclined stripping-rolls ride upwardly upon the stalks in passing the same and strip the ears of corn therefrom in the usual manner, the ears dropping down into the troughs 37. They are carried upward through the latter by the endless conveyers 72 and are discharged therefrom upon and between the sets of husking-rolls. The husks are stripped from the ears of corn in the manner explained and are drawn downward and dropped by the rolls upon the ground, the ears being discharged from the rolls by the drag-conveyers into the trough 91 and conveyed therefrom by elevating-conveyer 104, as will be readily understood.

From the above description it will be apparent that I have produced a machine of the character described which possesses the features of advantage enumerated as desirable and which obviously may be modified in various particulars without departing from the principle and scope or sacrificing any of the advantages of the invention.

Having thus described the invention, what I claim as new, and desire to secure by Letters Patent, is—

1. The combination, in a corn-harvester, with a pair of snapping-rolls arranged on an incline, an inclined trough located on each side of the snapping-rolls and resilient guide members, each of which comprises a single integral rearwardly-extending bar, the rear ends of the bars approaching each other to form a constricted opening therebetween and the extreme ends of the bars being bent sharply at right angles to their lengths and lying above and in close proximity to the lower ends of the snapping-rolls to cause corn sliding down the inclined snapping-rolls to be directed into the troughs below.

2. In a corn-harvester, the combination with a pair of snapping-rolls, an inclined trough located on each side of the pair of snapping-rolls, arms projecting forwardly from the lower ends of the troughs, rearwardly-inclined parallel bars secured to the forward ends of each of the arms, conveyers carried between each pair of bars, a rearwardly-extending resilient guide secured at its forward end to the under face of each of the lowermost bars, the guides converging toward one another, the free ends of the guides abutting each other above the snapping-rolls and in proximity thereto and tension-studs secured to the lowermost bars in the rear of the points at which the forward ends of the guides are secured, the resilient guides passing in front of and bearing against the studs at a point intermediate their ends.

In testimony whereof I affix my signature in the presence of two witnesses.

WILLIAM H. McKITRICK.

Witnesses:
 H. C. RODGERS,
 G. Y. THORPE.